May 12, 1931. N. DE VITO 1,805,130

VALVE

Filed Sept. 27, 1928

INVENTOR.
NICHOLAS DeVITO
BY Arthur C Eckert
ATTORNEY.

Patented May 12, 1931

1,805,130

UNITED STATES PATENT OFFICE

NICHOLAS DE VITO, OF ST. LOUIS, MISSOURI

VALVE

Application filed September 27, 1928. Serial No. 308,667.

The object of my invention is to make a valve to be used in steam or fluid lines; one that does not require packing to make and keep it tight. A further object is to make a valve in which the contact between the valve stem seat and the steam nut will be metal on metal forming a ground joint. By use of the valve the rotation of the valve stem seat in the steam nut will make the joint tighter.

A still further object is to make a valve in which the valve stem will not be raised or lowered with the raising or lowering of the plug in or out of the seat. This is an advantage because it enables the valve to be placed in a smaller space than is the case with the conventional valve.

Another object of the packless self grinding stem is that being self grinding it is perpetually leak proof and not only eliminates the conventional soft packing which must be replaced at intervals, but eliminates the inconvenience and damage due to steam or liquid leaking. This latter is a big factor because in practice after a leaking valve is discovered, it requires the shutting down of the plant or line by another valve in order to repair the leak in the valve.

A further object is to construct a valve that will stand abuse in practice and will not be made to leak by a sudden jar or jolt such as a hammer blow or a man standing on the stem.

Figure 1:
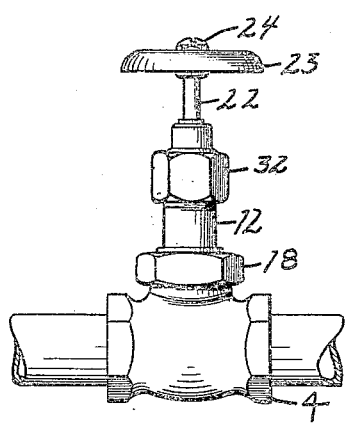
Figure 2:
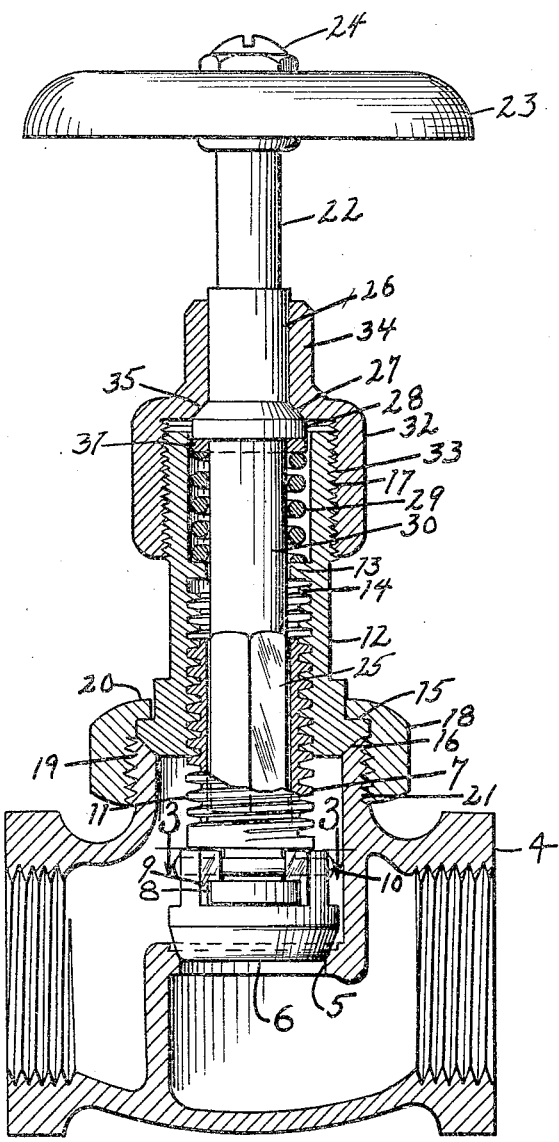
Figure 3:
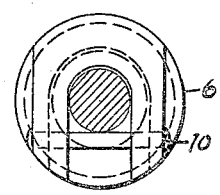

My valve may be made of few and simple parts that lend themselves readily to multiple production and may be easily assembled and put in place. With these and other objects in view my invention has relation to certain novel features of construction and arrangement of parts as will be hereinafter more fully described, pointed out in the claim and illustrated in the drawings in which Fig. 1 illustrates a section of pipe with my valve attached. Fig. 2 designates a longitudinal sectional elevation of my valve and Fig. 3 a sectional plan view on the line 3—3 of Fig. 2.

In the drawings a globe valve is shown, but my invention may be applied equally as well to a gate valve. Numeral 4 designates the conventional body of a globe valve, having the valve seat 5. Numeral 6 designates the conventional plug, which is seated in the valve seat 5; the plug 6 is attached to the auxiliary stem 7, by means of having the circular foot 8 in sliding engagement in the slot 9, in the plug 6; the pin 10 prevents the disengagement of the auxiliary stem 7 from the plug 6. This engagement between the auxiliary stem 7 and the plug 6 permits a slight relative movement, which enables the plug 6 to centralize itself when being seated. The auxiliary stem 7 is threaded with the threads 11. The auxiliary stem 7 is hollow, the hole being rectangular in cross section. Numeral 12 designates a bonnet having the internal annular flange 13 and internally threaded below this flange with the threads 14 and having the external annular flange 15 together with the beveled face 16 formed near its lower end. Numeral 17 designates external threads on the upper portion of the bonnet 12 above the internal annular flange 13. Numeral 18 designates a nut, having the internal threads 19 and the internal annular flange 20. Numeral 21 designates the external threads on the wall surrounding valve opening of the body 4. The nut 18 is used as the means of jointure between the bonnet 12 and the valve opening of the body 4. The hollow nut 18 is slipped over the bonnet 12 until the inner face of the internal annular flange 20 rests on the external annular flange 15. The internal threads 19 of the nut 18 will then come in engagement with the threads 21 on the wall surrounding valve opening of the body 4. The nut 18 is then screwed down until it assumes the position shown in Fig. 2. Numeral 22 designates the valve stem having the handle 23 secured thereto, by means of the nut 24. The cross section of the lower end of the valve stem 22 is rectangular as shown at 25. The rectangular portion of the valve stem 22 is of such size and shape as to easily slip into the rectangular hole in the upper portion of the auxiliary stem 8. The valve stem 22 has the reinforced section 26, which is slightly larger in diameter than the portion between it and the handle 23. At the lower portion of the reinforced section 26 is formed the ground seat 27, which is an annular beveled surface. Numeral 28 designates a small longitudinal section extending downwardly from the ground seat 27. Numeral 29 designates a spring, which envelopes the portion 30 of the valve stem 22 and rests on the internal annular flange 13 of the bonnet 12. Numeral 31 designates a washer placed on the valve stem 22 immediately beneath the stem portion 28 and above the spring 29. Numeral 32 designates a ground seat steam nut, which has the lower enlarged internally threaded section 33, and a smaller upper section 34. Beneath section 34 is the inclined surface 35. The ground seat steam nut 32 forms the juncture or holding means of the valve stem 22 of the bonnet 12. The lower section 33 of the ground seat steam nut 32 is in threaded engagement with the external thread 17 of the bonnet 12, which places the inclined face 35 in contact with the ground seat 27 of the ground seat steam nut 32. The smaller upper section 34 of the ground seat steam nut 32, as previously indicated is hollow and of such size as to be in rotatively frictional engagement with the reinforced section 26, of the valve stem 22. The ground seat 35 of the ground seat steam nut 32 together with the inclined surface 27 of the valve stem 22 form the steam tight joint between the valve stem 22 and the ground seat steam nut 32. It will be seen that when the valve stem 22 is turned by means of the handle 23, that the auxiliary stem 7 will be turned in the bonnet 12 and that, therefore, the plug 6, will be moved vertically in and out of engagement with the valve seat 5. It is to be observed that in this process the valve stem 22 is not moved longitudinally relative the valve.

The non-leaking properties of the valve stem depend upon the exact grinding and fitting of the ground seat 35 and the inclined surface 27. In order to prevent this surface from wearing irregularities it is necessary that dirt and other foreign substances not be brought between the two surfaces. This can only be accomplished by preventing the steam or liquid from coming in contact with these surfaces, and this in turn can only be accomplished by having the two surfaces in positive contact with each other. This is accomplished by the tension of the spring 29. The valve will function without the spring 29, but in that event the ground surface 35, indicated, would not always be in contact and would wear irregularities for the reasons indicated and eventually cause a leak.

What I claim and mean to secure by Letters Patent is:

A valve having a body portion and a valve seat formed in the body portion of said valve, a plug for selective engagement in the valve seat of the body portion of said valve, an auxiliary stem, said plug secured to said stem, a bonnet, said auxiliary stem secured in said bonnet, a nut, said nut securing said bonnet to the body portion of said valve, a valve stem having one end in sliding engagement in a rectangular hole in said auxiliary stem, an annular beveled ground seat formed on said valve stem, a ground seat steam nut in rotative contact with a cylindrical portion of said valve stem and securing the valve stem in operative position relative said bonnet, an annular beveled ground seat formed in said ground seat steam nut, the ground seats of said valve stem and said ground seat steam nut held together in sliding engagement by a spring enveloping said valve stem, resting at one end on an internal annular flange formed in said bonnet and in contact with a washer at its other end, which washer is in contact with a section of said valve stem.

In testimony whereof I affix my signature.

NICHOLAS DE VITO.